US011734590B2

(12) United States Patent
Hamilton et al.

(10) Patent No.: US 11,734,590 B2
(45) Date of Patent: Aug. 22, 2023

(54) SYSTEM AND METHOD FOR AUTOMATING OBSERVE-ORIENT-DECIDE-ACT (OODA) LOOP ENABLING COGNITIVE AUTONOMOUS AGENT SYSTEMS

(71) Applicant: NORTHROP GRUMMAN SYSTEMS CORPORATION, Falls Church, VA (US)

(72) Inventors: David J. Hamilton, Gainesville, VA (US); Todd Gillette, Severn, MD (US); Donald D. Steiner, Falls Church, VA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 449 days.

(21) Appl. No.: 16/902,981

(22) Filed: Jun. 16, 2020

(65) Prior Publication Data

US 2021/0390432 A1 Dec. 16, 2021

(51) Int. Cl.
*G06F 9/54* (2006.01)
*G06N 20/00* (2019.01)
(Continued)

(52) U.S. Cl.
CPC ............ *G06N 5/043* (2013.01); *G06F 9/545* (2013.01); *G06N 5/025* (2013.01); *G06N 20/00* (2019.01)

(58) Field of Classification Search
CPC ........ G06N 20/00; G06N 5/025; G06N 5/043; G06N 5/022; G06N 7/005; G06N 3/006; G06F 9/545; G06F 9/4881
(Continued)

(56) References Cited

U.S. PATENT DOCUMENTS 6,122,572 A 9/2000 Yavnai
6,842,674 B2 1/2005 Solomon
(Continued)

FOREIGN PATENT DOCUMENTS

EP 2355451 B1 1/2013
WO 01/88848 A2 11/2001

OTHER PUBLICATIONS

Pedro Patron, "Semantic-based adaptive mission planning for unmanned underwater vehicles", Ocean Systems Laboratory, School of Engineering and Physical Sciences, Heriot-Watt University, Apr. 2010, 212 sheets.

(Continued)

*Primary Examiner* — Chun Kuan Lee
(74) *Attorney, Agent, or Firm* — Katten Muchin Rosenman LLP

(57) ABSTRACT

The disclosed invention provides system and method for providing autonomous actions that are consistently applied to evolving missions in physical and virtual domains. The system includes a autonomy engine that is implanted in computing devices. The autonomy engine includes a sense component including one or more sensor drivers that are coupled to the one or more sensors, a model component including a world model, a decide component reacting to changes in the world model and generating a task based on the changes in the world model, and an act component receiving the task from the decide component and invoking actions based on the task. The sense component acquires data from the sensors and extracts knowledge from the acquired data. The model component receives the knowledge from the sense component, and creates or updates the world model based on the knowledge received from the sense component. The act component includes one or more
(Continued)

actuator drivers to apply the invoked actions to the physical and virtual domains.

20 Claims, 12 Drawing Sheets

(51) Int. Cl.
    *G06F 9/48*     (2006.01)
    *G06N 5/043*     (2023.01)
    *G06N 5/025*     (2023.01)

(58) Field of Classification Search
    USPC .......................................................... 706/46
    See application file for complete search history.

(56) References Cited

U.S. PATENT DOCUMENTS

| | | |
|---|---|---|
| 7,330,844 B2 | 2/2008 | Stoyen |
| 7,526,465 B1 | 4/2009 | Forsythe et al. |
| 7,580,819 B2 | 8/2009 | De et al. |
| 7,620,477 B2 | 11/2009 | Bruemmer |
| 7,685,083 B2 | 3/2010 | Fairweather |
| 8,180,622 B2 * | 5/2012 | Nasle ...................... G06F 30/20 703/18 |
| 8,661,980 B1 | 3/2014 | Roemerman et al. |
| 10,338,913 B2 | 7/2019 | Franchitti |
| 10,377,375 B2 | 8/2019 | Jones et al. |
| 10,666,076 B1 * | 5/2020 | Kohn .................. G01R 31/367 |
| 2006/0167917 A1 | 7/2006 | Solomon |
| 2007/0271002 A1 | 11/2007 | Hoskinson et al. |
| 2010/0015579 A1 | 1/2010 | Schlabach |
| 2010/0205021 A1 | 8/2010 | Jewett et al. |
| 2015/0286969 A1 | 10/2015 | Warner et al. |
| 2019/0213290 A1 | 7/2019 | Delva |
| 2021/0150359 A1 * | 5/2021 | Canedo .................... G06N 3/08 |

OTHER PUBLICATIONS

Pedro Patron et al., "Adaptive mission planning: the embedded OODA loop", Ocean Systems Laboratory, Heriot-Watt University, Edinburgh, Scotland, UK, EH144AS, 10 sheets.

Miario Paulo Brito et al., "The Role of Adaptive Mission Planning and Control in Persistent Autonomous Underwater Vehicles Presence", 9 sheets.

Yvan R. Petillot et al., "Adaptive mission plan diagnosis and repair for fault recovery in autonomous underwater vehicles", ResearchGate, Conference Paper, Oct. 2008, DOI:10.1109/OCEANS.2008.5151975, Source IEEE Xplore, 10 sheets.

\* cited by examiner

SYSTEM AND METHOD FOR AUTOMATING OBSERVE-ORIENT-DECIDE-ACT (OODA) LOOP ENABLING COGNITIVE AUTONOMOUS AGENT SYSTEMS

BACKGROUND

Multi-agent systems (MAS) have been considered to be an optimal software paradigm for increasingly distributed and data-centric computing needs. Though MAS popularity has decreased due to the rise of web services, cloud computing, and other advances in software engineering, the underlying principles are still well-suited to the type of problems that can be solved with autonomous and cognitive capabilities. There are many findings and working software implementations from previous research that can be leveraged, as well as a number of academic and commercial organizations that have continued to mature this field.

There are many available open source MAS frameworks of varying levels of maturity, purpose, and popularity. Java Agent Development framework (JADE) may be the most popular MAS framework primarily because it is easy to use, complies with industry standards, and provides a simple agent lifecycle that can be readily extended to support a variety of use cases. Though JADE facilitates quick prototyping and demonstration of small scenarios, it is primarily a framework for research and cannot scale to meet the performance requirements of customers' missions. For example, CybelePro™, developed by Intelligent Automation, Inc. (IAI), is a proprietary MAS framework that provides similar functional capabilities to JADE but it has proven that it can support large-scale distributed missions. Other commercial companies have provided intelligent agent solutions that support cognitive decision aiding, dynamic mission planning, and predictive analytics use cases. These commercial and industry MAS technologies have provided solutions focused on particular domains and/or capabilities, and a truly reusable MAS framework that satisfies all requirements has yet to be realized.

For example, autonomous agent technology is becoming integral to the modern battlefield. With the overwhelming complexity of information combinatorics, it is no longer tenable to expect that human operators will be able to control all assets. Autonomy offloads the details of mission actions under changing conditions from the operators. As more systems incorporate autonomy, it becomes important to provide a cost effective way to implement autonomous agents tuned to specific mission objectives: heterogeneity, cross-domain, reusability, integration with advanced machine learning and plan generation techniques that operate on data, portability to different hardware platforms, operating systems, and programming languages with minimal changes in software code.

SUMMARY

The cognitive autonomous agent system of the disclosed invention enables a reusable software framework that can be readily applied to configure, test, and deploy autonomous systems capable of understanding commander's intent and following mission plans together with autonomous (machine) and human teammates. The agent system of the disclosed invention further enables seamless transition from solutions employing advanced automation to cognitive autonomy.

These and others advantages may be provided by, for example, a cognitive autonomous agent system for providing autonomous actions that are consistently applied to evolving missions in physical and virtual domains. The cognitive autonomous agent system includes one or more sensors deployed in physical and virtual domains to monitor and acquire data from the physical and virtual domains, and one or more computing devices including one or more processors and one or more non-transitory computer readable media including instructions for an autonomy engine. The instructions causes the one or more processors to execute the autonomy engine which includes a sense component including one or more sensor drivers that are coupled to the one or more sensors, a model component including a world model, a decide component reacting to changes in the world model and generating a task based on the changes in the world model, and an act component receiving the task from the decide component and invoking actions based on the task. The sense component acquires data from the sensors and extracts knowledge from the acquired data. The model component receives the knowledge from the sense component, and creates or updates the world model based on the knowledge received from the sense component. The act component includes one or more actuator drivers to apply the invoked actions to the physical and virtual domains.

The cognitive autonomous agent system may further include one or more actuators coupled to the actuator drivers to apply the invoked actions to the physical and virtual domains. The instructions may further include a collaboration component that provides collaborations with operators and another autonomy engines. The autonomy engine may further include one or more hybrid drivers that are combinations of actuator drivers and sensor drivers. The hybrid drivers may be used when the sensed data is acquired by querying data to the sensors. The world model may use web ontology language (OWL) semantic web standard to represent the physical and virtual domains, and sensing and actuating capabilities. The world model may include knowledge of past, current, and future predicted states of the physical and virtual domains. The decide component may be configured to provide reactions and plans. The reactions are made based on manually generated rules and/or machine learning generated rules, and the plans are pre-defined plans and/or automatically generated plans. The act component may update the world model with expected effects of the invoked actions. The act component may monitor successes and failures of the invoked actions applied to the actuators in order to evaluate preconditions of subsequent tasks. The autonomy engine may implement Embedded Networked Intelligent Agent Kernel (ENIAK) as an underlying kernel. The sensors may include one or more selected from a group consisting of imaging sensors, acoustic sensors, motion sensors, temperature sensors, chemical sensors, and network sensors.

These and others advantages may be provided by, for example, a method for providing autonomous actions that are consistently applied to evolving missions in physical and virtual domains. The method includes steps of acquiring data from one or more sensors deployed in the physical and virtual domains, converting the data into knowledge via a sense component of an autonomy engine, creating or updating a world model based on the knowledge received from the sensor component, reacting to changes in the world model and generating one or more tasks based on the changes in the world model, and invoking actions based on the tasks. The sense component includes one or more sensor drivers that are coupled to the one or more sensors and extract the knowledge from the acquired data. The act component includes one or more actuator drivers to apply the invoked actions to the physical and virtual domains.

The actuator drivers may be coupled to one or more actuators and the invoked actions are applied to the physical and virtual domains through the actuators. The creating or updating a world model may include mapping the acquired data to the world model. The knowledge may be represented by triples that define parameters including nominal status, goals, and business processes, unit tasks, and preconditions. The reacting to changes may further include passing triples that represent the knowledge to a decide component of the autonomy engine, running a rule engine on each of the triples and determines whether the triple is a communications message or goal, searching for a process that satisfies the goal if the triple is the goal, generating a plan including tasks that implement capabilities if the process is found, extracting tasks from the plan, and passing the tasks to the actuator drivers. The extracting tasks may further include determining whether the plan is a unit task, and passing the plan to a business process manager that steps through sub-tasks of the plan and choice points, if the plan is not the unit task.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTIONS

Figure 1:
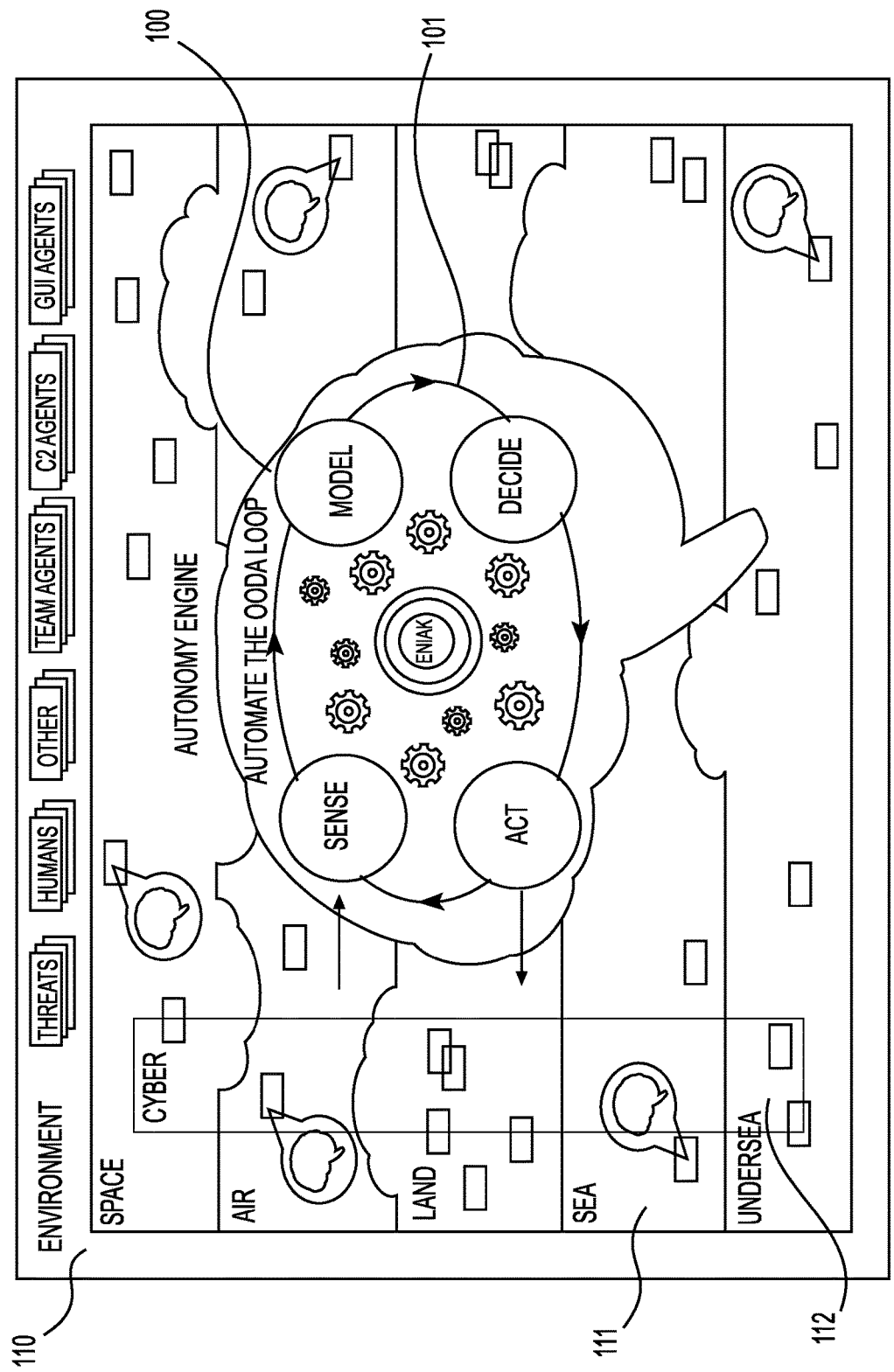
FIG. 1 shows a diagram illustrating the cognitive autonomous agent system operating in the environment for behavioral design decisions.

In this section, some embodiments of the invention will be described more fully with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Embodiments utilize an Embedded Networked Intelligent Agent Kernel (ENIAK). ENIAK reduces cost and time to deploy by providing a common kernel with plug-and-play components as building blocks. ENIAK is unique in its combined use of a self-contained World Model in the context of observe-orient-decide-act (OODA) loop automation all packed into a componentized kernel architecture with pluggable sensors. Conventional systems require programming of the agent behavior as software code conforming to the underlying programming language which the systems are written in. A significant novelty of the ENIAK approach is that all agent behavior is coded in semantic data structures that can be reasoned about in their own right. Shifting from software-defined to data-defined and rigorously adhering to the OODA loop.

ENIAK provides an extensible software framework that enables autonomous capabilities to be consistently applied to the customers' evolving missions in both physical and virtual domains, and is central to the autonomous capability. ENIAK provides the foundation for implementation of autonomous agents in a manner that is modular and reusable. ENIAK provides a reusable software framework to enable faster time-to-market at lower development cost to the company and, ultimately, enhanced functionality delivered quickly and with low total lifecycle costs to the customers. ENIAK allows for the rapid development, integration, testing, and demonstration of the evolving autonomous capabilities and new cognitive technologies across the customer domains.

Fundamental to advancing the autonomous capabilities is the ability to rapidly integrate and effectively manage a variety of on-board sensors and actuators required for accomplishing mission objectives in ever-changing environments in real-time. The autonomous system needs to understand commander's intent and collaborate with other warfighters and systems in achieving mission goals. Rapid advances in low size, weight, and power (SWaP) high-performance computation are enabling the practical deployment of artificial intelligence techniques, including machine learning, knowledge representation, and decision-making. Advanced autonomous systems must support a seamless transition path from readily deployable advanced automation solutions to future cognitive decision aiding and cognitive autonomy solutions. The underlying autonomy system architecture must be open, reusable, and extensible while remaining secure and reliable. The architecture will optimally be applicable to autonomous systems across mission domains including virtual domains (cyberspace, networks, intelligence, and information technology (IT)) and physical domains (underwater, maritime, land, air, and space).

To this end, embodiments of the disclosed invention provide a cognitive autonomy engine that automates the time-honored observe-orient-decide-act (OODA) loop, and a cognitive autonomous agent system ("agent") that includes the cognitive autonomy engine, sensors, and actuators. The sensors and actuators are interfaces that monitor and manage the environment and/or assets. The cognitive autonomy engine may be a form of a reusable software that can be implemented in computing hardware or servers. The autonomy engine includes instructions that can be stored in one or more non-transitory media of one or more computing devices and can be executed by processors of the computing devices. In embodiments, ENIAK is an underlying kernel of the cognitive autonomous agent system of the disclosed invention to computer-aided engineering (CAE) that manages the flow and processing of data across components of the cognitive autonomous agent system. Embodiments of the cognitive autonomous agent system includes the following components:

Sense (observe) component: receiving and processing data from coupled sensors.

Model (orient) component: creating and maintaining a World Model based upon knowledge received from the sense component via the sensors.

Decide component (decider): enabling computational decision making based on the situational context provided by the World Model.

Act component (actor): responsible for executing the actions and tasks as defined by the selected mission plan in the decide component.

Collaborate component: collaboration with human and autonomous teammates is performed according to the OODA loop framework.

Embodiments disclosed herein demonstrate the applicability of the sense, model, decide, act and collaborate components by developing prototypes using autonomy engine including these components in two different domains: reducing operator workload through business process automation in IT operations, and mission planning and execution in autonomous under-seas operations.

With respect to FIG. 1, shown is a diagram illustrating an embodiment of the cognitive autonomous system operating in an environment for behavioral design decisions. Referring to FIG. 1, the autonomous (or autonomy) engine 100, which includes the automated OODA loop 101, operates in the environment 110. The environment 110 may include assets and/or activities related to, for example, threats, humans, team agents, C2 agents, graphic user interface (GUI) agents and other assets or activities. These assets and activities of the environment 110 may exist in the physical domains 111 such as space, air, land, sea and undersea, and may exist in the virtual domains 112 such as cyberspace, networks, intelligence domains, and information technology domains. The autonomy engine 100 detects the assets or activities in the environment 110, performs decision-making through the OODA loop 101, and invokes proper actions or tasks to the environment based on the decision. The autonomous engine 100 may interact with the environment 110 with sensors and actuators (see FIG. 3).

In embodiments, ENIAK 107 (see FIG. 4) is a core of the cognitive autonomous engine 100. It may be analogous to a mini operating system, which may be implemented in computing hardware, computing devices, and servers, and may be software that is common to all instances of agents. ENIAK 107 satisfies the following requirements (but are not limited to):

Small size: minimum lines of code to perform core functions and capabilities.

Fast operation: code readability can be compromised in favor of speed.

Efficient operation: minimal memory and system resource utilization.

OODA: implements loop from capability-specific plug-in components that determine conditionals of decision logic.

Input-processing-output (IPO): all agents have inputs, perform some operation on those inputs (even if null for a given state change), and provide output (i.e. next state following transition).

State: the kernel implements a state machine where time and associated state is maintained in the kernel.

Plug-ins: agents are customized with software components that define the interfaces to the inputs and outputs, and the behavior of the OODA Loop.

ENIAK 107 is also designed based on the following requirements: behavioral design requirements and component selection requirements. The behavioral design requirements provide cost effective mechanism to facilitate sensor interfaces to a variety of systems types, develop and maintain a World Model 108 (see FIGS. 3 and 4) over which reasoning can be accomplished to enable higher levels of decision-making, make decisions based on reasoning about the information contained in the World Model 108, and perform actions based upon their cognitive capabilities gleaned from reasoning about the information contained in the World Model 108. The component selection requirements facilitate platform independence, and provide embedded capabilities for real-time performance. The component selection requirements are deployable to low size, weight, and power (SWaP) platforms, and are ubiquitous software development environment, and are micro-services compatible.

ENIAK 107 provides a cost effective mechanism to facilitate sensor interfaces to a variety of systems types leveraging a modular, plug-in like interface mechanism. The ENIAK kernel has "hooks" for modular, reusable sensor interfaces. A World Model 108 is maintained over which reasoning can be accomplished to enable higher levels of decision-making. A semantic web capability implements the resource description framework (RDF) triple-stores of the World Model 108. Reasoning about the information contained in the World Model 108 is performed, and actions gleaned from reasoning about information contained in the World Model 108 leverages a business process manager (BPM) capability.

Figure 2:
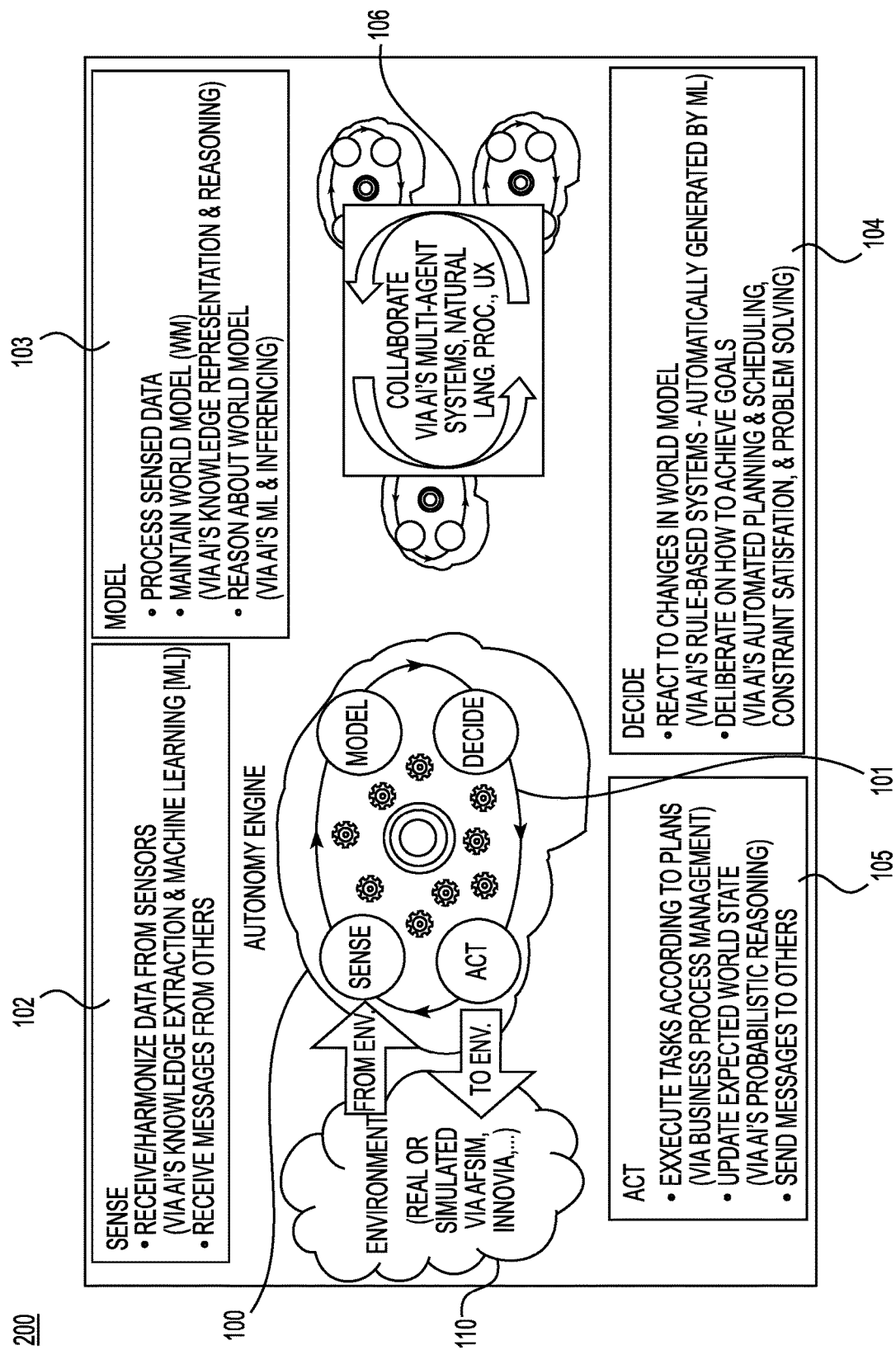
FIG. 2 shows an architectural view of the cognitive autonomous agent system.
Figure 3:
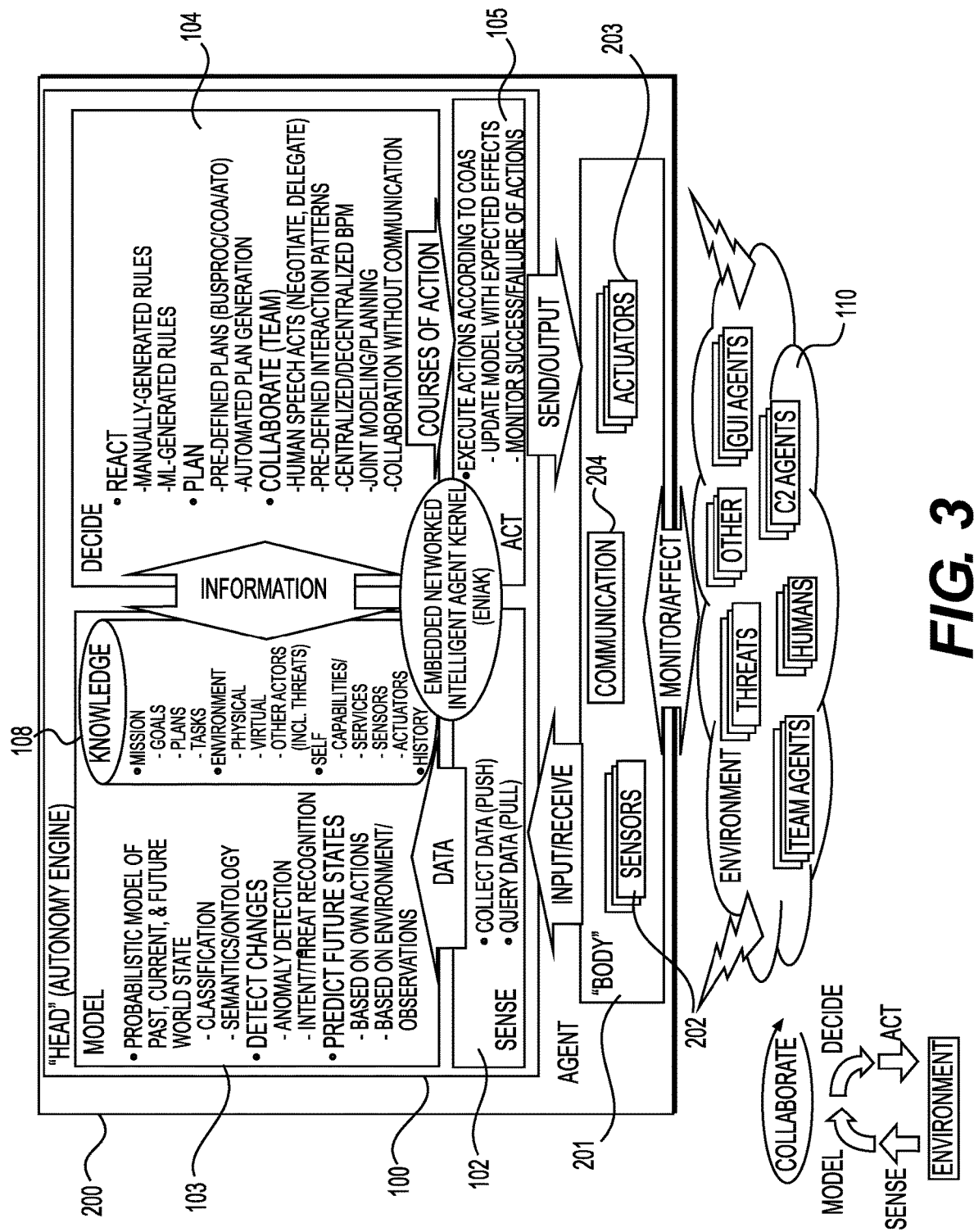
FIG. 3 shows a diagram illustrating structures and features of the cognitive autonomous agent system.

With reference to FIG. 2, shown is an architectural view of the cognitive autonomous agent system of the disclosed invention. With reference to FIG. 3, shown is a diagram illustrating structures and features of the cognitive autonomous agent system of the disclosed invention. Referring to FIGS. 2 and 3, the cognitive autonomous agent system 200 include a cognitive autonomy engine 100, which may be referred to as a head, and an interface 201, which may be referred to as a body. The cognitive autonomy engine 100 includes sense component 102, model component 103, decide component 104, and act component 105, which together form an OODA loop 101. The cognitive autonomy engine automates the OODA loop 101. The autonomy engine 100 operates in the environment 110 through the interface 201. The interface 201 includes one or more sensors 202, one or more actuators 203, and communications adapters 204. The interface 201 interacts with the environment 110 to monitor activities in the environment, to manage assets in the environment, and to acquire data from the environment through the sensors 202. The interface 201 applies proper actions or tasks to the environment 110 through the actuators 203. The proper actions are decided through the OODA loop 101 performed by the autonomy engine. The interface 201 may be coupled to the autonomy engine 100 through wires, networking, or wireless communications. The cognitive autonomous agent system 200 further include a collaborate component 106. The collaboration component 106 facilitates communication and collaboration with other autonomous agents and humans.

The sense (observe) component 102 receives and processes data from coupled sensors 202. The sense component 102 may receive and/or harmonize data from sensors 202 via artificial intelligence (AI) knowledge extraction and machine learning (ML). The sense component 102 may receive messages from other sources. The sense component 102 may include sensor drivers 121 (see FIG. 4) that apply data analytics to raw data from sensors 202 to extract relevant knowledge, such as event patterns and anomalies. Smart sensors may directly provide actionable intelligence (e.g. Automated Target Recognition). As shown in FIG. 3, the sense component 102 is coupled to the interface 201 to receive input data from the environment 110. The sense component 102 collects data ("push") and/or queries data ("pull"). The data received by the sense component 102 is transferred to the model component 103.

The model (orient) component 103 processes the sensed data, creates, maintains, or updates a World Model (WM) 108 via AI's knowledge representation and reasoning, and reason about the World Model 108 via AI's deep learning, machine learning and inferencing. The model component 103 creates, or maintains and updates a World Model 108 based upon knowledge received from the sense component 102 via the sensors 202. The World Model 108 uses web ontology language (OWL) semantic web standard to represent not only the environment in which the agent operates, but also knowledge about the agent's sensing, actuating, and other relevant capabilities, external agents and humans (both teammates and adversaries), and mission objectives, plans, and tasks. A semantic web capability implements the resource description framework (RDF) triple-stores of the World Model 108. This knowledge includes knowledge of past, current, and future predicted world states. The deep learning, on either simulations or real world experience, is used to automatically generate and enhance the ontology, minimizing the brittleness that is often associated with manually generated ontologies. The machine learning and data analytics techniques such as information fusion, event correlation, anomaly detection, threat classification, and predictive analysis are applied to the World Model 108 to derive further information required for automated decision making that, in turn, is also asserted into the World Model 108. As shown in FIG. 3, the model component 103 build a probabilistic model (World Model 108) of past, current and future world state based on classification and semantics/ontology. The model component 103 detects changes which includes anomaly detection and intent and threat recognition. The model component 103 predicts future states based on own actions and based on environment and observations. The knowledge based World Model 108 includes representations for missions, environment, self, and history. The missions may include goals, plans, and tasks. The environment may include elements such as activities or actions in physical domains, virtual domains, and other actions including threats. The self may include the agent's capabilities and services.

The decide component 104 is coupled to the model component 103, and reacts to changes in the World Model 108 via AI's rule-based systems which may be automatically generated by machine learning, and deliberates on how to achieve goals via AI's automated planning and scheduling, constraint satisfaction, and problem solving. The World Model 108 provides the situational context enabling computational decision making. Reactive behavior is enabled by automatically selecting mission plans (ATOS) as triggered by changes in the World Model 108 based upon pre-defined or learned rules. Deliberative (goal-directed) behavior is enabled by using automated planning and scheduling techniques to generate mission plans and allocate resources based on pre-conditions and expected effects of actions as represented in the World Model 108. The decide component 104 is configured to provide reactions, plans, and collaborations. The reactions may be based on manually generated rules and/or machine learning generated rules. The plans may be pre-defined plans and/or automatically generated plans. The collaborations may include human speech actions such as negotiation and delegation, pre-defined interaction patterns, collaborations with centralize or decentralized business process plans, joint modeling or planning, and collaborations without communications.

The act component 105 executes tasks according to plans via business process management, updates expected world state via AI's probabilistic reasoning, and send message to others. The act component 105 is responsible for executing the actions and tasks as defined by the selected mission plan in the decide component 104. Mission plans are represented using the object management group (OMG) business process model and notation (BPMN) standards that are both human and machine-readable. All pre-conditions are verified prior to executing actions and the World Model 108 is updated with expected effects of the actions. The act component 105 may execute actions according to course of actions (COAs), updating model with expected effects and monitoring success and failure of actions.

The collaborate component 106 provides collaboration with human operators and autonomous teammates (other autonomy engines) is performed according to the OODA loop framework via AI's multi-agent systems, natural language process, user experience, etc. All communication is managed through the sense component 102 (inbound commands) and act component 105 (outbound commands), enabling adoption of a wide variety of communication protocols. The IEEE Foundation for Intelligent Physical Agents (FIPA) standards for agent communication and collaboration present a formal framework for multi-agent collaboration based on how humans communicate (speech acts). FIPA interaction protocols support collaborative processes (tasking, resource allocation, negotiation) and are represented as plans comprising core communication primitives. This approach is compatible with battle management language (BML) and its derivatives for expressing Commanders Intent and battle orders. BML has been successfully demonstrated for joint forces missions (e.g., NATO missions with multiple NATO members participating). Third Party components/standards leveraged include Jena, RDF, W3, jBPM, Drools, BPMN, and FIPA. BML originated from and is maintained by George Mason University's C4I and Cyber Center.

The behavior of a specific instance of an autonomous agent is dictated upon instantiation. The actual act of instantiation is essentially starting a service on a machine with the minimum required software components to provide the necessary capabilities to implement a set of behaviors. The act of dynamically updating an agent's capability is to send the agent messages instructing it to either turn off a plug-in or to add software as a service plug-ins to the agent's configured capability suite. Plug-ins will implement specific capabilities. There may be a library of plug-ins available to the agent manager for configuring instantiations of agents, both initially and dynamically. Specific drivers will be provided for specific devices, and provided as plug-ins. For example, an agent must receive synchronous input from both a camera and a microphone and generate asynchronous output in the form of alerts. The plug-ins involved would likely implement the interface between the camera and the agent, the microphone and the agent, the agent and the recipient of the alerts, and the associated decision logic (i.e., the OODA loop) to produce the alerts. In this example, there are at least four plug-ins involved. While the autonomous agent is running, the OODA loop decision logic may change, and since temporal context is important, the operator must not re-start the agent. The operator then message the agent to re-configure itself to use a new plug-in that reflects the new decision logic. However, because this reconfiguration now requires the plug-in for this decision logic to be remotely accessed and is no longer self-contained within the service instance, the time required to access the logic slows the agent processing. As long as the agent processing time is still within a specification, this is not a problem. However, if the agent slows too much, then a re-instantiation of the instance will be required.

Figure 4:
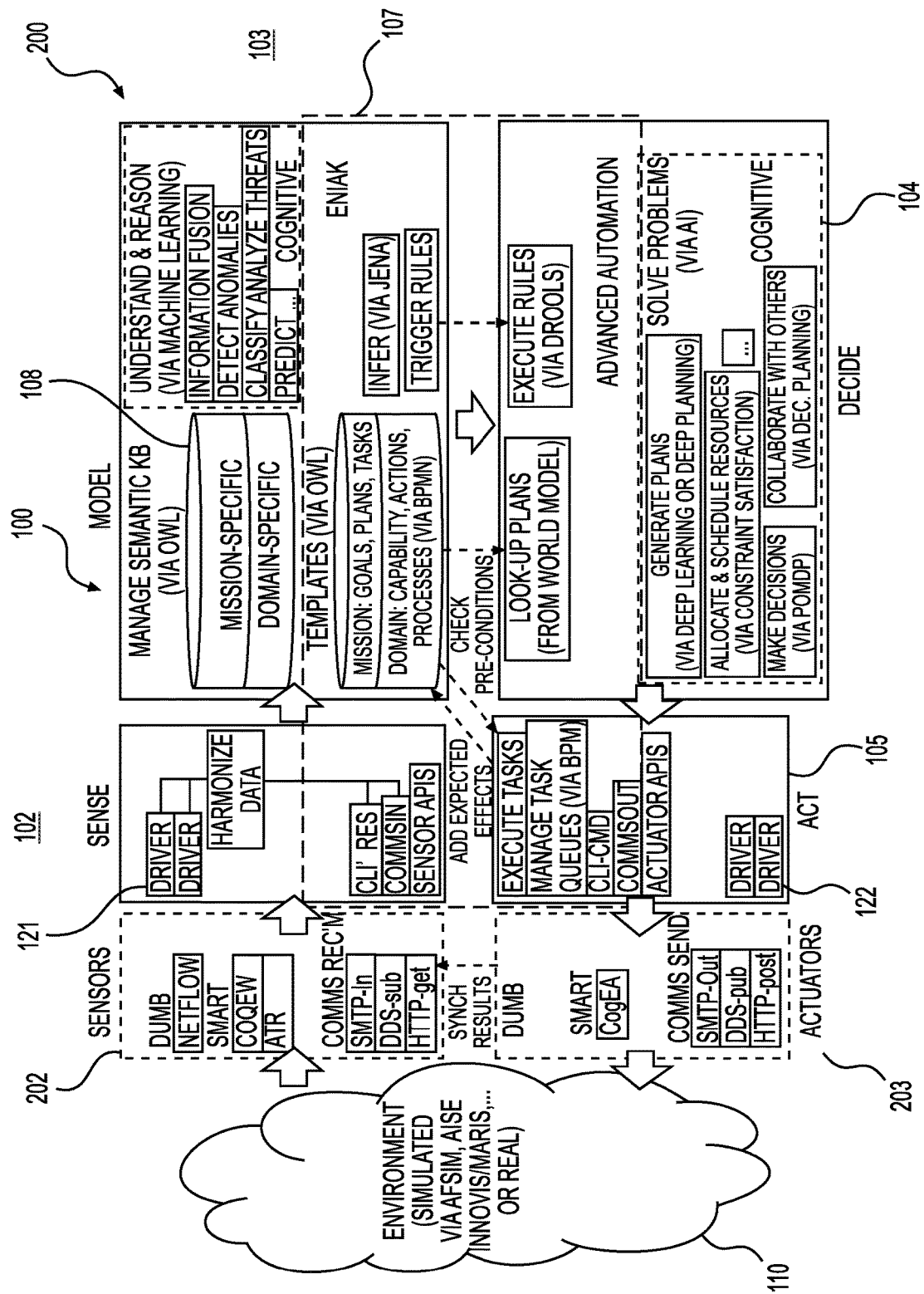
FIG. 4 shows an architectural view illustrating components and their relationships of the cognitive autonomous agent system.

With reference to FIG. 4, shown is an architectural view illustrating components and elements of the cognitive autonomous system of the disclosed invention. The diagram in FIG. 4 shows the components and their relationships. The cognitive autonomous agent system 200 includes one or more sensors 202, one or more actuators 203, and an autonomy engine 100 which includes the sense component 102, model component 103, decide component 104, and the act component 105. The sense component 102 includes sensor drivers 121 to control the sensors 202 and actuator drivers 122 to control the actuators 203. Moreover, the autonomy engine may include hybrid drivers 124 (see FIG. 9) and communication drivers. The hybrid drivers 124 are combinations actuator and sensor drivers 121. The hybrid drivers 124 can be used when the sensed data is acquired by pulling data from a resource rather than from a pushed data resource. As shown in FIG. 4, the modules of the cognitive autonomous agent system 200 further include ENIAK 107 and a World Model 108 that is created and maintained by the model component 103. ENIAK 107 may be a singleton that manages and serves as intermediary between components. ENIAK 107 reserves and has methods for accessing ports. The purpose of a singleton is to control object creation, limiting the number of objects to only one. Since there is only one singleton instance, any instance fields of a singleton will occur only once per class, just like static fields. Singletons often control access to resources, such as database connections or sockets. The singleton makes sure that only one connection is made or that only one thread can access the connection at a time.

The sense component 102 manages sensor drivers 121. The model component 103 manages orient-related plugins. The World Model 108 may be a singleton that sets up, manages, and communicates with the knowledge base. The decide component (decider) 104 manages decide-related plugins. The act component (actor) 105 manages actuator drivers 122, contains execute task which is invoked by the rules engine and business process manager (BPM), and invokes the BPM and actuator drivers 122 depending on whether the task is a plan or unit task.

Figure 5:
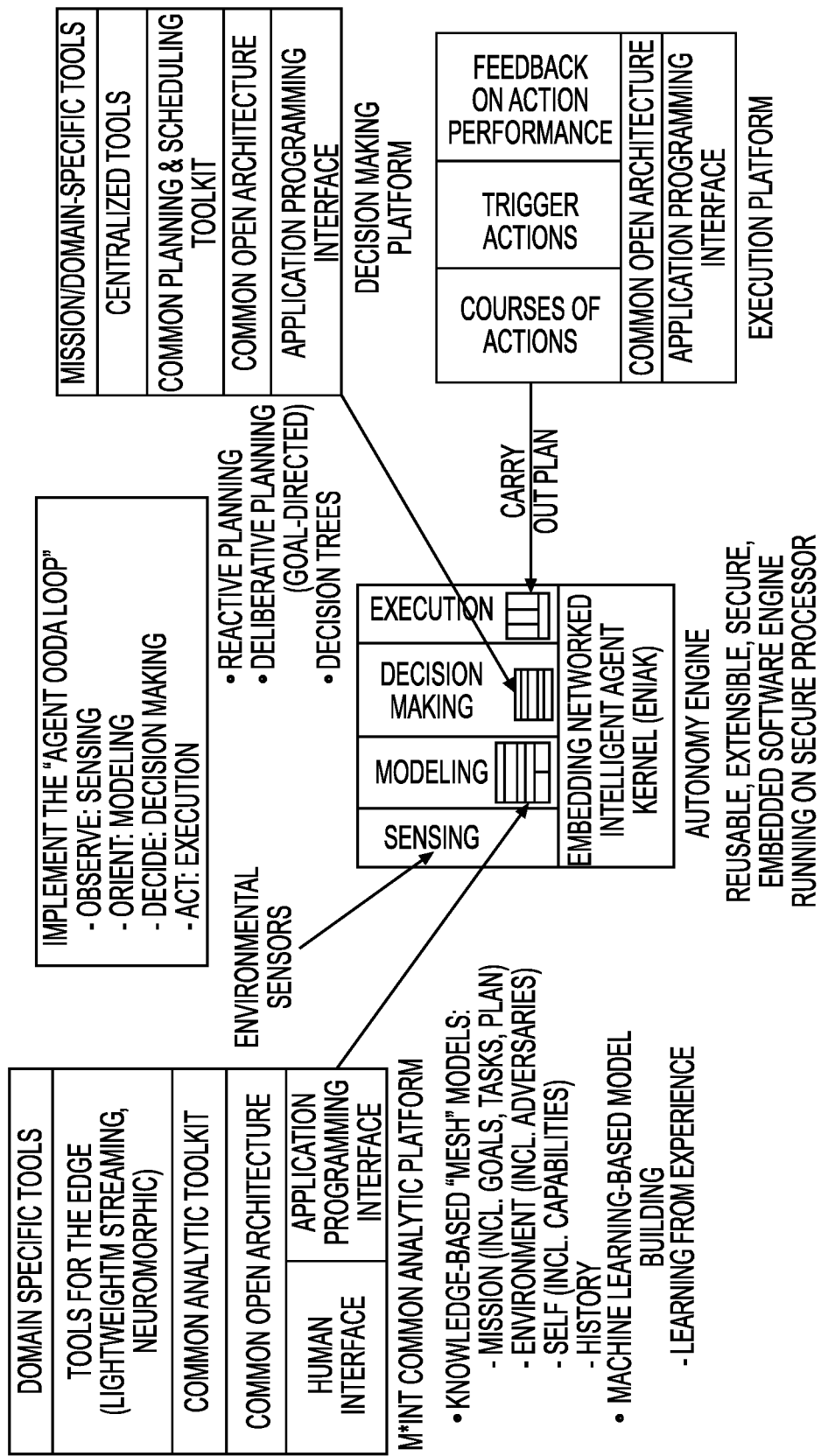
FIG. 5 shows a diagram illustrating elements of an ENIAK autonomy engine.

With reference to FIG. 5, shown is a diagram illustrating elements of autonomy engine of ENIAK 107 shown in FIG. 4. ENIAK 107 is a reusable, extensible, secure, embedded software engine running on secure processor. ENIAK 107 implements the OODA loop 101 through the sense component 102, model component 103, decision (decision making) component and act (execution) component. The sense component 102 includes sensor drivers 121 to control sensors 202 to monitor and acquire environmental data. The model component 103 includes domain specific tools, tools for Edge which is light weight, streaming, and neuromorphic, common analytic toolkits, and common open architecture. The model component 103 is configured to implement human interfaces and application programming interfaces.

The model component 103 build knowledge-based models (e.g., the World Model) that may include mission model including goals, tasks, and plans, environment model including adversaries, self-model including agent's capabilities, and history. The model component 103 also may build machine learning-based models that learns from experience. The decide component 104 (decision making platform) includes mission and domain specific tools, centralized tools, common planning and scheduling toolkit, and common open architecture. The decide component 104 also implements application programing interfaces. The act component 105 (execution platform) carries out plans decided by the decide component 104. The act component 105 includes common open architecture and drivers to control the actuators 203. The act component 105 implements application programing interfaces, and performs course of actions, trigger actions and feedback on action performances.

The core of the autonomy engine is ENIAK 107, an embedded, networked, intelligent agent kernel that controls the scheduling and execution of the multi-threaded components of the automated) loop of sensing, modeling, decision making and execution as well as the interfaces to the external environment. ENIAK 107 is architected to ensure reusability across physical and virtual environments, extensibility to future autonomous capabilities, and secure processing. At a high level, ENIAK 107 sets up the OODA modules, determines what technical abilities each module has, and drives the OODA loop 101 based on the agent's capabilities. ENIAK 107 is responsible for managing capabilities, obtaining sensor data, updating the World Model 108 with sensing data, applying Drools rules to all new sensing data added to the World Model 108, generating actions and plans based on information added to the World Model 108. Action plans are implemented by the business process manager, and unit tasks are implemented by ENIAK actuator driver. Information and errors are communicated back and forth.

The autonomy engine enables situational awareness of the autonomous agent by including libraries that allow the agent to sense its surroundings, build models that represent its environment, self, and mission (ESM), and detect changes to its world state. Advanced edge analytics and semantic knowledge representation are key enabling technologies that support situational awareness. The autonomy engine integrates reactive (rule-based) and deliberative (goal-based) planning and scheduling libraries with ENIAK 107 to allow the autonomous agent to make decisions under uncertainty based on its modeled world state and act upon these decisions in order to achieve mission objectives.

The cognitive autonomous agent system of the disclosed invention includes sensor drivers 121, actuator drivers 122, hybrid drivers 124 (see FIG. 9), and communication drivers. In computing programs, the sensor drivers 121 may be defined in SensorDriver class. The SensorDriver enables ENIAK 107 to "sense" information from the environment/context from which the cognitive autonomous agent system is operating. An agent system must receive data from at least one sensor driver, and can receive information from many different sensors. The sensor driver is capable of receiving streaming data at different sampling rates, or discrete data. The SensorDriver class is an abstract class that requires a name and a port number. Each discrete sensor driver is registered with ENIAK 107 and must extend the SensorDriver abstract class to enforce ENIAK's management of all sensor drivers. The SensorDriver class employs ENIAK's accept-socket (acceptSocket) method which ensures there are no conflicts between each of the registered drivers.

Sensor drivers are run as separate threads that are managed by the sense module. In the modeling step performed in the model component 103, sensing data is mapped to the World Model whenever an agent updates the World Model (World-Model) with the sensed data.

ENIAK 107 includes a class named StreamedSensor-Driver which can be configured for use with most sensor drivers 121. Each stream handler must implement ENIAK's StreamHandler interface and define the setInputStream method in order for an input stream to be read and managed. The setInputStream method determines how streamed data is partitioned into blocks for processing by the interface DataMapper. The agent is responsible for implementing the DataMapper interface and must specify how the TripleMutliSet method will convert the input data into triples that are consistent with agent ontologies. The agent class implementing the DataMapper interface can use the TripleMulti-Set and SubjectTripleSet methods to create sets of triples that StreamedSensorDriver then inserts into the World Model. The agent class implementing the DataMapper interface can also extend ENIAK's SparqlAdapter class to update the WorldModel directly using SPARQL statements. Extending the SparqlAdapter class has the added advantage of providing convenience methods and new URIs can be generated for subjects using the getUniqueInstanceId and getUniqueInstanceUri methods.

The actuator drivers 122 may be defined in ActuatorDriver class. The ActuatorDriver enables ENIAK 107 to "act" upon information received from the environment/context from which the agent system is operating. Actuator drivers 122 perform unit task actions that were generated after the sensed data was added to the World Model. The ActuatorDriver class is an abstract class that is implemented by ENIAK's ClientActuatorDriver class. The ClientActuatorDriver class manages connections and assumes a single address and port for the target of the driver's communication. Similar to the sense module, actuator drivers 122 are run as separate threads that are managed by the actor module. Recall that the sense module manages the sensor drivers). Each concrete actuator driver 122 must extend the ActuatorDriver abstract class and the ActionInvocation method must be implemented. The agent is responsible for implementing concrete actuator drivers that implement the agent specific actions.

An actuator driver is invoked with a task identification (ID) and a set of parameters in the form of an ActionInvocation object via the method addInvocation(ActionInvocation). The parameters are keyed by parameter names and values can be of any data type. Strings are provided by the method that retrieves parameters from the World Model. The addInvocation method adds the ActionInvocation to a blocking queue, while the ActuatorDriver loops (until shut down) and waits on that queue. When a value is found, the run (ActionInvocation) method, which must be implemented by a concrete actuator driver, is called.

Hybrid drivers 124 are combinations of actuator and sensor drivers. The hybrid drivers 124 can be used when the sensed data is acquired by pulling (querying) data from a resource rather than from a pushed (collecting) data from resources. Hybrid drivers 124 can use the actuator driver to request data from the resource, and the sensor driver to capture the response. While this could be accomplished with a separate driver, there could be utility to tagging the sensor data with the URI of the task that produced the request. The hybrid drivers 124 are defined in HybridDriver class. The HybridDriver extends the abstract class ActuatorDriver and contains a CoupledSensorDriver. Upon invocation, the hybrid driver instructs the coupled sensor driver to tag the next data received with the task URI provided. The coupled sensor driver may include that task URI in its triples. Sensor drivers and World Model ontologies may provide a protocol for such observations, limiting the responsibility of defining certain observation metadata.

Communications drivers may include HttpServerDriver class that is a single communications driver that listens for messages communicated by other agents via HTTP. The port can be configured with Eniak.setHttpPort. In embodiments it is possible to specify whether this communications driver is active or not. The HttpServerDriver has a CommsHttpServer that extends NanoHTTPD, a small and light-weight HTTP server. The driver and server have methods to register a data mapper for any given content type specified in the HTTP message header. If no data mapper is provided, a warning is logged and the message is ignored. Multi-part messages are managed independently, with each part of the message going through an invocation of the specified data mapper. A data mapper can directly insert triples into the World Model, or return triples via a TripleMultiSet for the CommsHttpServer to enter into the World Model. Actuator drivers that send messages to other agents may operate independently. However, a single communications actuator driver may take parameters to determine which specific driver to invoke, similarly to how the HttpServerDriver passes its data to specific data mappers.

The World Model 108 is a knowledge-based model, and may be represented by KnowledgeBase class that is an interface which must be implemented for the agent to function. The implementation determines how triples are stored, managed, and retrieved. The default implementation is JenaKnowledgeBase. The knowledge base also manages changes in listeners with WorldModelChangeListener. This allows for trigger conditions that invoke the rules engine and connect the World Model 108 and decide stages of the OODA loop 101.

ENIAK 107 has a core ontology, which may be stored, for example, in a directory "src/main/resources/WorldModelOntology.rdf" (moved to "resources!" on build), that defines types and relationships dealing with goals, capabilities, tasks, statuses, agents, core communications protocols (i.e., FIPA ACL), resources (including sensor and actuator drivers), costs, and beliefs (implementation ongoing). The core ontology will yet grow as more core functionality is added. The World Model ontologies and data are only pre-loaded via WorldModel initialization as specified in worldmodel.properties. Additional ontologies and initial World Model data may be loaded as specified in agent.properties. A future internal action may be created (and defined in the core World Model 108) enabling live loading of new ontology data via agent-communication or plugin. WorldModel methods for handling RDF input already exist.

The KnowledgeBase implementation includes an implementation of KnowledgeBaseListener that registers WorldModelListeners and notifies those listeners when a change has been made to the knowledge base. The KnowledgeBaseListener implementations do not require the notification methods as they come from the ObjectListener class. The KnowledgeBaseListener may be turned into an abstract class that extends ObjectListener in order to ensure that implementations implement added and removed methods. A WorldModelListener is initialized with a RulesEngine and calls the rule engine's processFact methodupon being notified of an added or removed fact. ENIAK 107 may create a single WorldModelListener on initialization and includes the rules engine specified in agent.properties.

The decide component 104 of the OODA loop is composed of a World Model 108 change listener, a rules engine, and a set of rules for handling goals, plans, and wait conditions. Specifically, when any change is made to the knowledge base, the rules engine examines the added or deleted triples to determine whether they match any of the defined rules. Those checks may be implemented in the separate DroolsRulesEngine project (ENIAK-Components). The rules are written in a Drools file (.drl). Ideally the rules would be written in a general format capable of being processed by any implementation of the ENIAK RulesEngine interface such that the rules themselves do not need to be rewritten for each implementation. The rules code uses queries in WorldModelQuery to determine how to proceed.

When an agent receives a goal for itself the "If Actor. Self assigned a Goal" rule is triggered. The rule seeks out a process that can satisfy the goal. If a process is found, the rule then creates a plan (along with subtasks) as the concrete instantiation of the process. The new plan is passed to the Eniak.executeTask to be executed. The class implementing the interface BusinssProcessManager must contain an executeTask method. The executeTask method instructs the jBPM to start the business process. If a process is not found, the failure may be logged. However, a planning module may be called to generate a new process using known capabilities. Additionally, failure conditions may lead to specific outcomes which are yet to be designed and developed.

The actor module includes the Actor class/object and the business process manager (managed by ENIAK 107). The Actor class registers and manages capabilities, actuator drivers, executes tasks, and implements a portion of the WaitFor functionality. The business process manager manages and executes processes.

Business process management (BusinessProcessManager) is an interface that contains methods for registering and executing a business process. When a business process is registered via a call to Eniak.registerProcess. ENIAK 107 passes the registration to the business process manager (BPM). The BPM must implement ENIAK's BusinessProcessManager interface and provide methods for registering and executing the business process. The current implementation, com.ngc.rapid.bpm.jbpm.BPMNManager, uses jBPM and is found in the jBPM project of the ENIAK-Components repository. The name of the class responsible for implementing the BusinessProcessManager is specified in agent.properties. Processes are registered on startup as well as when the planning module (to be developed) generates a new process. When registering a process, appropriate entries (preconditions, parameters, and expected effects) are added to the World Model 108 if they do not already exist. On startup, any pre-defined processes located in the data directory of the agent project are registered with ENIAK 107. These processes are added to the World Model 108 and registered with the BPM. On start-up, any processes defined in the World Model 108 and present in the data directory are registered with the BPM. A startup script may separately register processes using the same method used by the planner.

When Actor.registerActuatorDriver is called, the actuatorDriver is stored in a map and a message is provided to the Actor (via super-class AgentModule). Messages are processed as part of the Actor's thread, so nothing will happen with the driver until the agent, and thus the Actor thread, has been started. Actor.processMessage takes any registration messages and then starts a thread for the actuator driver which is then ready to accept invocations via actions. Because a given actuator driver may be used by multiple distinct actions, actions must be mapped to actuator drivers using Actor.mapActionToDriver(actionName, actuatorDriver). In fact, the actionName is a URI (to be corrected).

Figure 6:
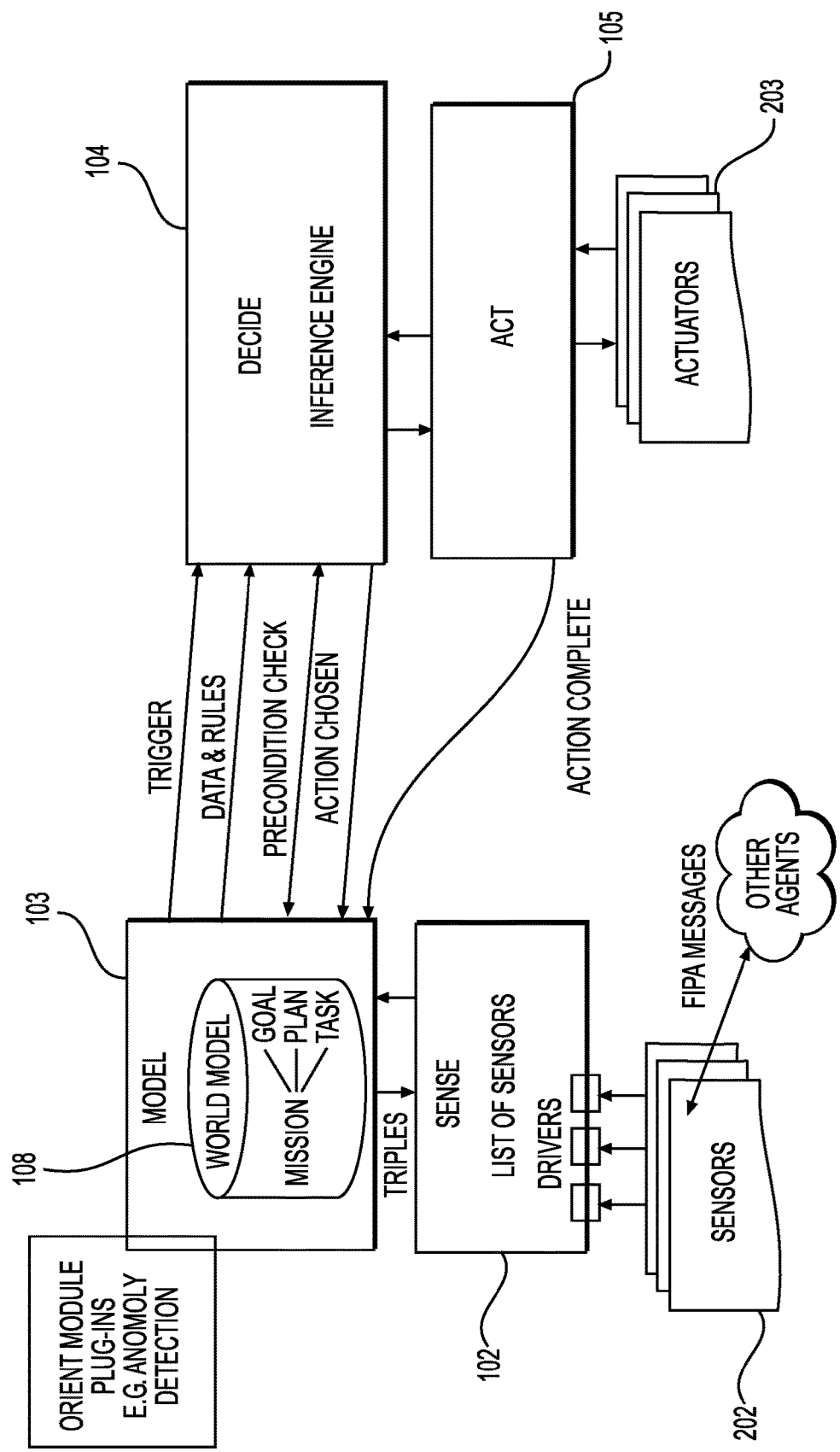
FIG. 6 shows is a diagram illustrating overall concept of execution of the cognitive autonomy engine.
Figure 7:
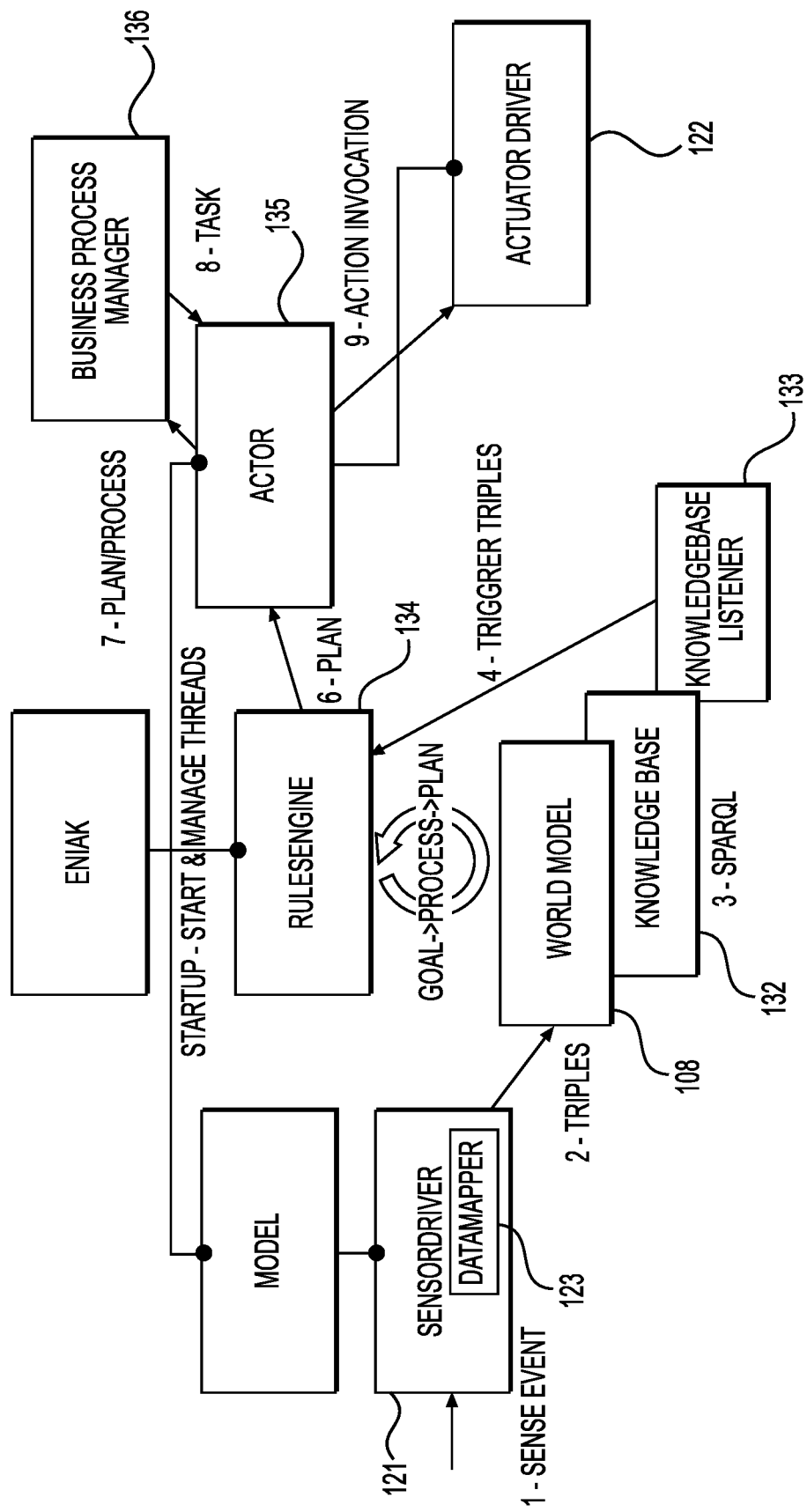
FIG. 7 shows a dataflow diagram which illustrates steps in the dataflow of the cognitive autonomous agent system.
Figure 8A:
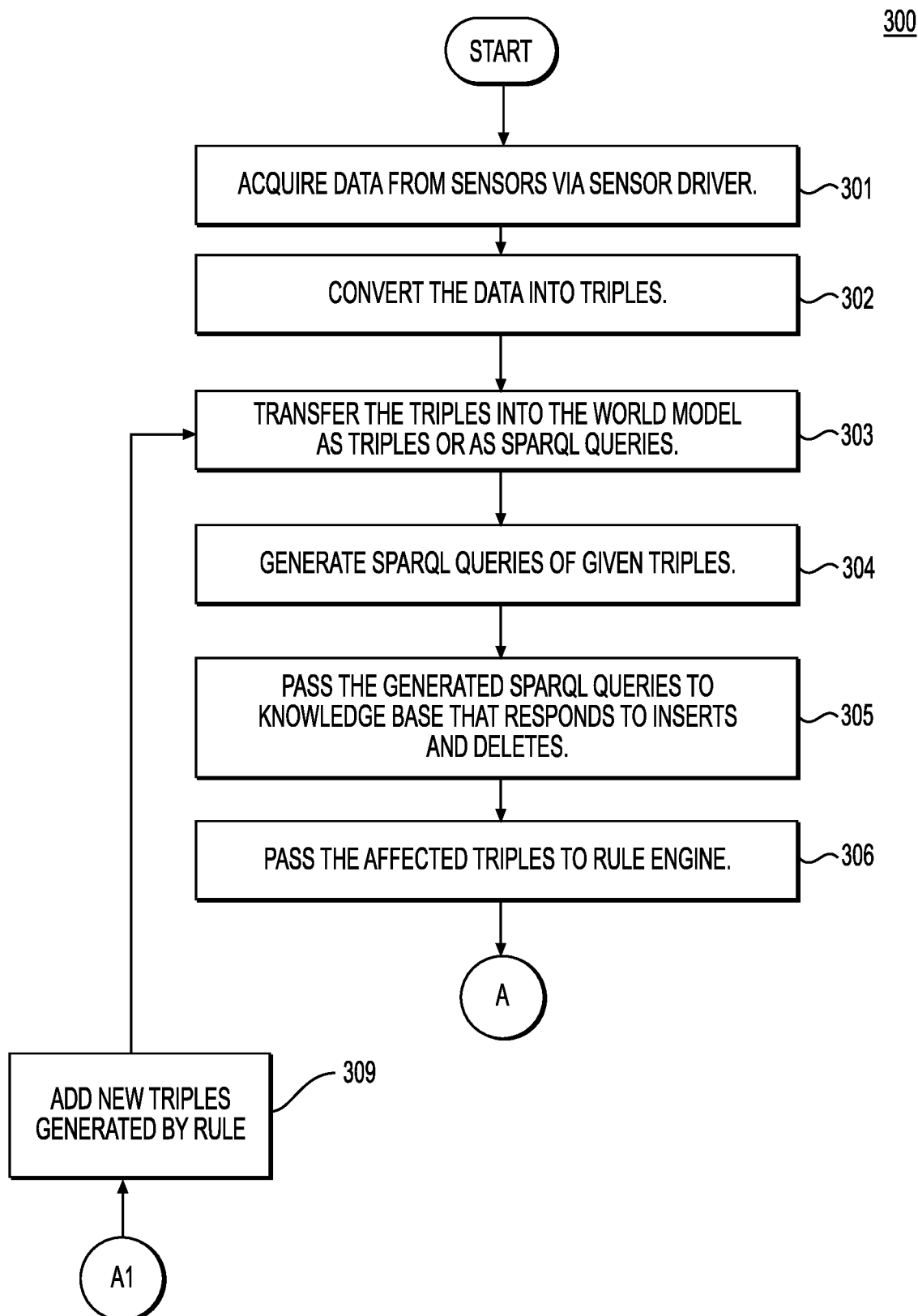
FIGS. 8A-8C show workflow diagrams illustrating method for enabling autonomous capabilities to be consistently applied to evolving missions in both physical and virtual domains.
Figure 8B:
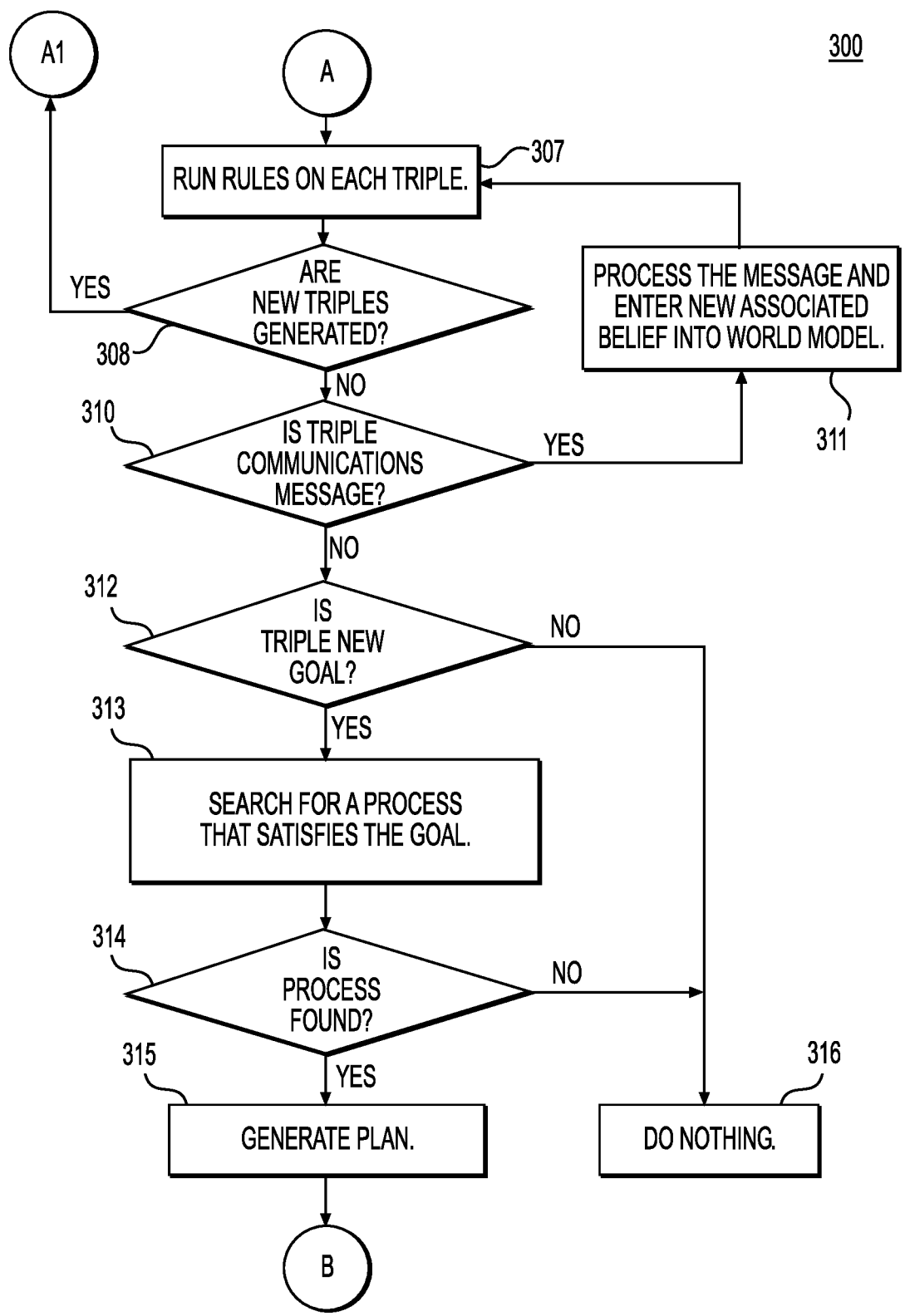
Figure 8C:
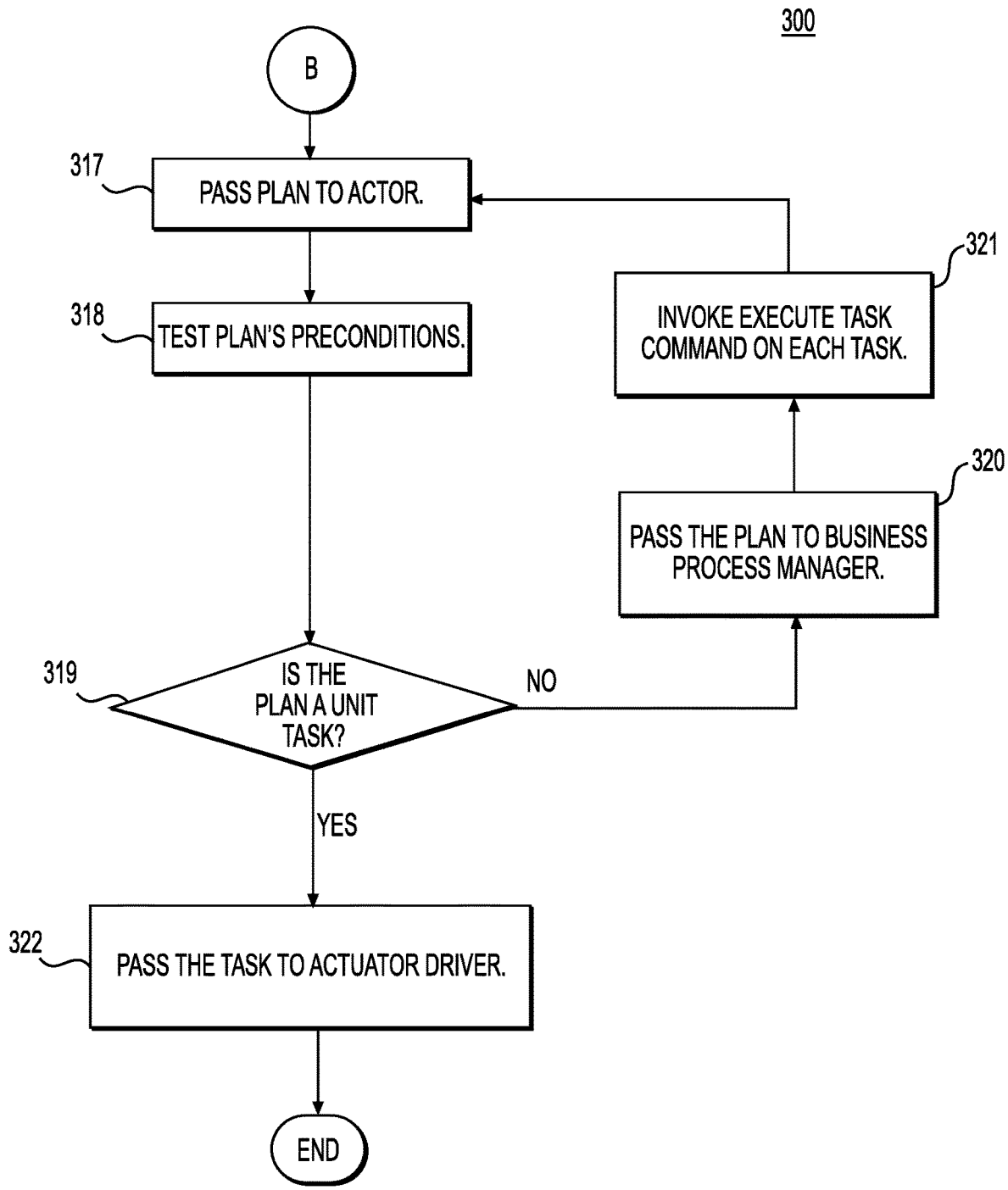

With reference to FIG. 6, shown is a diagram illustrating overall concept of execution of the cognitive autonomy engine. With reference to FIG. 7, shown is a dataflow diagram which illustrates steps in the dataflow of the cognitive autonomous agent system ("agent"). With reference to FIGS. 8A-8C, shown are workflow diagrams illustrating method for enabling autonomous capabilities to be consistently applied to evolving missions in both physical and virtual domains. The disclosed invention provides methods for providing autonomous actions that are consistently applied to evolving missions in physical and virtual cyber domains. The following descriptions of processes are accompanied by an example of a sensor driver that obtains voltage measurements for an asset (environment) that is being monitored.

Referring to FIGS. 6, 7 and 8A-8C, ENIAK 107 sets up the OODA modules (components), determines what technical abilities each module (component) has, and drives the OODA loop 101 based on the agent's capabilities. When ENIAK 107 is initialized, a core ontology WorldModelOntology.rdf provides a template for creating agent ontologies. Agent's World Model 108 is constructed using template and agent specific information contained in an input text file located, for example, in the directory of "ENAIK/src/main/resources." The input text file contains triples that define use case parameters such as nominal status, overvoltage status, goals, and business processes including actions (unit tasks), preconditions, and parameters. One or more sensor drivers 121 reads data over sockets of the sensors 202, block 301. The sensor driver 121 invokes its data mapper (DataMapper) 123 to convert the data into triples that are consistent with agent ontologies, block 302. The triples may represent knowledge extracted from the data acquired by the sensors 202. The acquired data is mapped to the World Model 108 whenever an agent updates the World Model 108 with the sensed data. In the example of the voltage measurement, the triples are generated for ontology specific information such as "VoltageMeasurement," "hasVoltageMeasurement," "hasTime," "hasVoltage," and "hasObservationTime." Either the sensor driver 121 or the data mapper 123 passes those triples into the World Model 108 as triples or as SPARQL queries, block 303. The World Model 108 generates SPARQL queries of given triples, block 304, and then passes the SPARQL queries to the knowledge base 132 which runs insert or delete statements for the triples based on the SPARQL queries, block 305. The knowledge base listener 133 responds to every insert and delete made to the World Model 108, and passes the affected (trigger) triples to the rules engine 134, block 306. The triples may be passed through its registered WorldModelListener with processFact method.

The rules engine runs its rules on each triple, block 307. All new inserts are processed by the Drools rules engine by calls from the WorldModelListener processFact method. When a threshold is exceeded, it may specify that something is broken. Any status that is over threshold is considered broken and a generic rule to fix the broken asset will provide a generic use of the rules. This will require an ontology entity such as assetsthatcanMonitored. Drools rules are located in drl files, for example, in "DroolsRulesEngine/src/main/resources/rules" directory. No rules are triggered when status is within the normal range. Rule is triggered when status exceeds threshold value as defined in the World Model 108. Drools rule inserts a new triple to the World Model 108 that defines a goal based on the broken status. The thresholds may be defined as a minimum and/or maximum value in specified units. They may be loaded into the World Model during initialization for a given domain or mission using specification files, or during operation by custom rules or plugin modules as appropriate. When the rule engine runs on triples, the rule engine may generate one or more new triples, including goals. If one or more new triples are generated, block 308, the one or more new triples generated by rule are added and new goal may be inserted, block 309.

If the triple is a communications message, block 310, it processes the message and enters the new associated beliefs of the communications message into the World Model 108, and triggers the step 307, block 311. Some rules may monitor triples to trigger new goals. If the triple is a new goal, block 312, the rules engine searches for a process that satisfies the goal, block 313. The goalURI is a parameter which Drools uses it to get to the goal so that it can compare it to the expected effects of the available processes. If a process is found, block 314, the rules engine generates a plan (a set of tasks that implement abstract capabilities) from the process, block 315. The plan may include a set of tasks or a unit task. If two different processes are found but only one meets preconditions, the process that meets the preconditions may be selected. Drools retrieves business process from the World Model 108. Drools checks preconditions based on goal definition what is the output URI. Otherwise do nothing, block 316. Plugin modules may generate new processes that can resolve a goal given current conditions or evaluate two candidate processes to choose the most efficient or likely to succeed. See FIG. 4. The decision component 104 shows the plugins.

The rules engine passes the plan to Actor.executeTask of actor 135, block 317, via Eniak.executeTask as ENIAK 107 is globally available and contains references to each module. The Actor.executeTask method tests preconditions of the tasks of the plan, block 318, and determines whether the plan is a unit task. If the plan is not a unit task, block 319, the plan is passed to the business process manager (BPM) 136, block 320. The business process manager steps through sub-tasks of the plan and choice points, invoking the actor's execute task command (executeTask) on each sub-task, block 321. If the sub-task is a sub-plan, the BPM is invoked again. If the task or sub-task is a unit task, its parameters (task commands) are loaded and passed to the actuator driver 122 associated with the action that the unit task implements, block 322. If the task is a wait task (a form of unit task), the WaitFor functionality is trigged, causing the calling thread to be blocked until a set of conditions is met or the given duration elapses, when the wait actuator driver's addInvocation method is called. Ultimately the wait task ends and control/flow is returned to the parent Actor.executeTask along with success or failure status, based on whether the condition was satisfied or time elapsed.

The act component 105 may monitor success and failure of actions in order to evaluate the preconditions of subsequent tasks. The monitoring successes and failures may be performed directly and indirectly. For example, the act component 105 may directly monitor and determine whether the actuator driver is capable of carrying out a unit task (precondition) and whether it does initiate the task. The "successes and failures" may also refer to whether the intended effects of the task are achieved. The act component 105 may evaluate successes and failures indirectly through the rest of the CODA loop, such as sensing effects on the environment and updating the World Model accordingly for any preconditions and their wait-for tasks to check against, as part of evaluating preconditions for subsequent tasks and deciding whether to continue a multi-step task, adjust it, or cancel it. In other words, the act component 105 monitors successes and failures of the invoked actions applied to the actuators, directly in terms of their initiation of the action, and indirectly via the sense component 102 and model component 103 in terms of whether the action achieves its intended effect(s), in order to evaluate preconditions of subsequent tasks.

Figure 9:
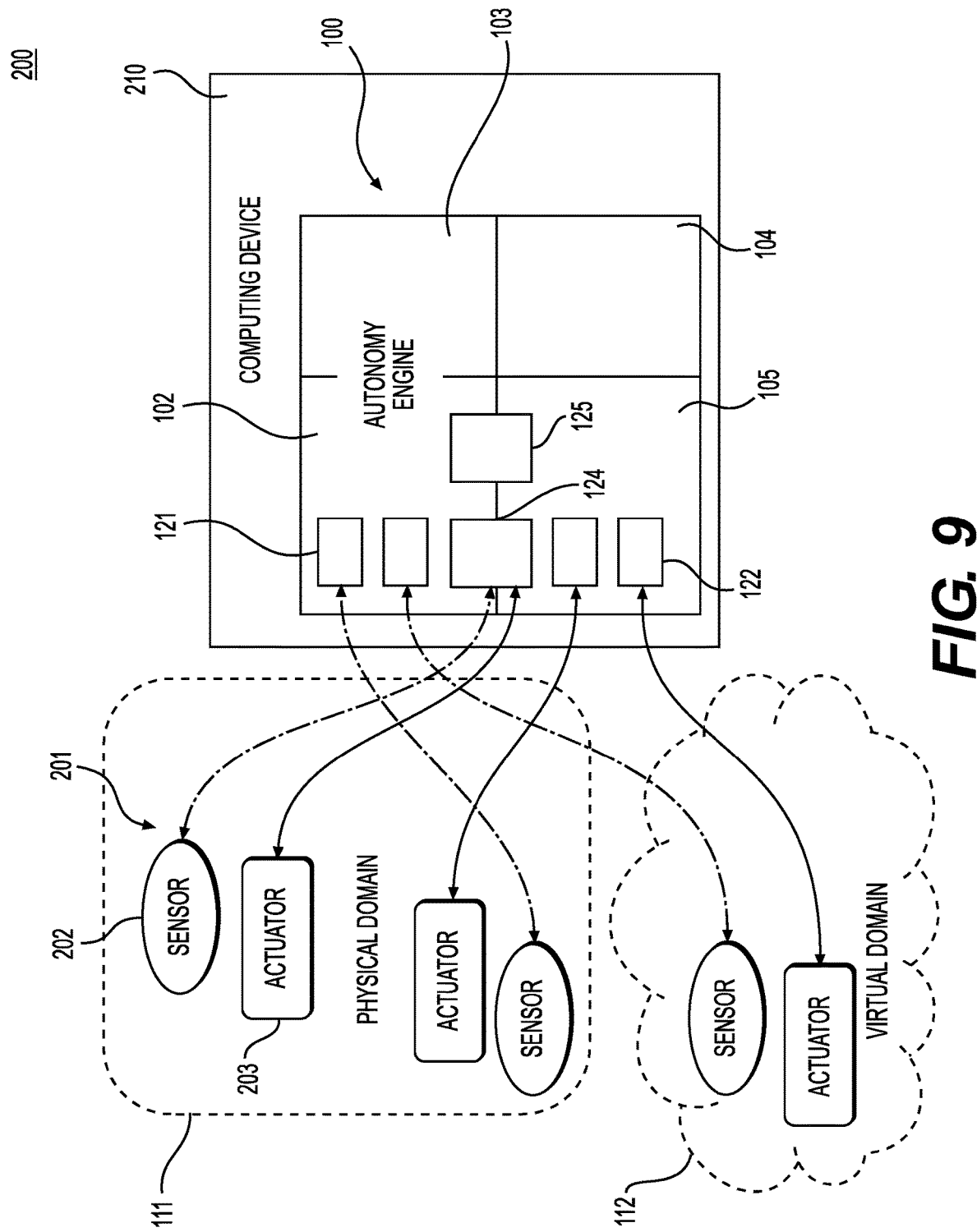
FIG. 9 shows an exemplary diagram of the cognitive autonomous agent system implemented in computing devices.

With reference to FIG. 9, shown is an exemplary diagram of the cognitive autonomous agent system for providing autonomous actions that are consistently applied to evolving missions in physical and cyber domains. The cognitive autonomous agent system 200 of the disclosed invention includes one or more computing devices 210 including one or more processors and one or more non-transitory computer readable media that includes instructions for an autonomy engine that performs the operations, for example, as shown in FIGS. 8A-8C. The instructions can be executed by the one or more processors of the computing devices 210. As described above, the autonomy engine 100 includes the sense component 102, the model component 103, decide the component 104, and the act component 105.

The cognitive autonomous agent system monitors activities and manages asserts in the environment that includes physical domains 111 and virtual domains 112. The agent system 200 acquires data from the environment through sensors 202 deployed in the environment. The data may include real data or simulated data which may be acquired through AFSIM, InnoVis, etc. The sensors 202 may include monitoring tools such as tools and devices that monitor activities and assets of an enterprise (e.g., networks, machines, computers, environments, personnel, etc.) for security issues, risks, events, environmental conditions and other data that is ordinarily monitored, and may include virtually any other device that produces data streams that need to be monitored. The sensors 202 may include components, devices or systems that detect physical activities or parameters. The sensors 202 may include, for example, image detectors such as cameras and video recorder, acoustic detectors, motion detectors, light sensing devices, temperature detectors, and chemical detectors. The sensors 202 for the virtual domains may include network detectors that monitor and analyze network activities in an enterprise network, network audit components that may monitor and analyze user activities in real time on a workstation or desktop, and database audit components that monitors database activities. The sensors 202 in the virtual domains may detect anomalies in the cyber space. Once the act component 105 of the agent system 200 invokes actions, the invoked actions are applied to the actuators 203 deployed in the environment. The actuators 203 makes changes to managed assets in the environment or takes proper actions in activities in the environment. The actuators 203 may include actuators for virtual environments and physical environments. The actuators for virtual environments may include, for example, computer system command interfaces for task management systems, network routing, or cyber-response capabilities. Actuators for physical environments may include steering control of a mobile platform, measurement instruments, radio and antenna systems (for sensing, communications, and non-kinetic effects), or robotic arms and other such devices for manipulation of the internal or external environment. The sensors 202 are coupled to the sensor drivers 121 or hybrid drivers 124, and the actuators 203 are coupled to the actuator drivers 122 or the hybrid drivers 124. The cognitive autonomous agent system 200 also includes communications drivers 125, the functions of which are described above.

As described above, the physical domains 111 include facilities or areas in space, air, land, sea and undersea. The domains are real world environments such as manufacturing facilities, military facilities, cites, ports, airports, air spaces, and operational areas (such as battlefields) and/or areas under surveillance in space, sky, land, sea and undersea. The sensors 202 and actuators 203 for the physical domains 111 may be deployed in the facilities or areas of the real world. The virtual domain 112 may include cyberspace, networks, intelligence domains, and information technology (IT) domains. The sensors 202 and actuators 203 for the virtual domains 112 may be in forms of computer programming instructions stored in storage media or in forms of hardware control elements (such as transistors, diodes, and optical components) included in, for example, switches, routers, signal generators, transmitters, receivers, and network cables. Parameters of the physical domains may exist in the virtual domains in forms of models, representations and simulations of the real world. In this case, the sensors 202 may detect the parameters in, for example, the simulated real world, and the actuators 203 may take actions that change or adjust the parameters in the simulated real world.

The actions of the autonomous engine in response to CODA may be achieved by invoking the actuators 203. In the physical domains 111, the actions of the invoked actuators 203 may include adjusting movement of mobile platforms, starting video and/or audio recording, tracking motions, turning on measurement instruments to collect more parameters, turning on or off light, turning on or off equipment, activating weapons, activating countermeasures, shutting down buildings or facilities, and triggering alerts. In the virtual domains 112, for example, when the sensor 202 detects anomalies in network activities, the actuator 203 may invoke actions, in response to the tasks from the act component 105, such as triggering alerts, sending alarm messages, communications triggering further analysis and/or action, commands instructing the restriction or shutting down of an affected workstation, database, network or network access, initiation of additional targeted monitoring and analysis, restricting or shutting off access to a network, locking down a building or portion of a building, and alerting security. The actuators 203 may take actions that make necessary changes or adjustments to computer system command interfaces, network routing, cyber-response capabilities, and any affected managed assets. Actuators 203 in an IT setting may be a virtualization management suite. The actions in the physical domains 111 and virtual domains 112 may be performed separately or may be combined together to provide collaborative effects. For example, data received from sensors 202 in the virtual domains 112 may initiate actions in the physical domains 111 as well as in the virtual domains 112. Similarly, data received from sensors 202 in the physical domains 111 may initiate actions in the physical domains 111 and/or virtual domains 112.

Figure 10:
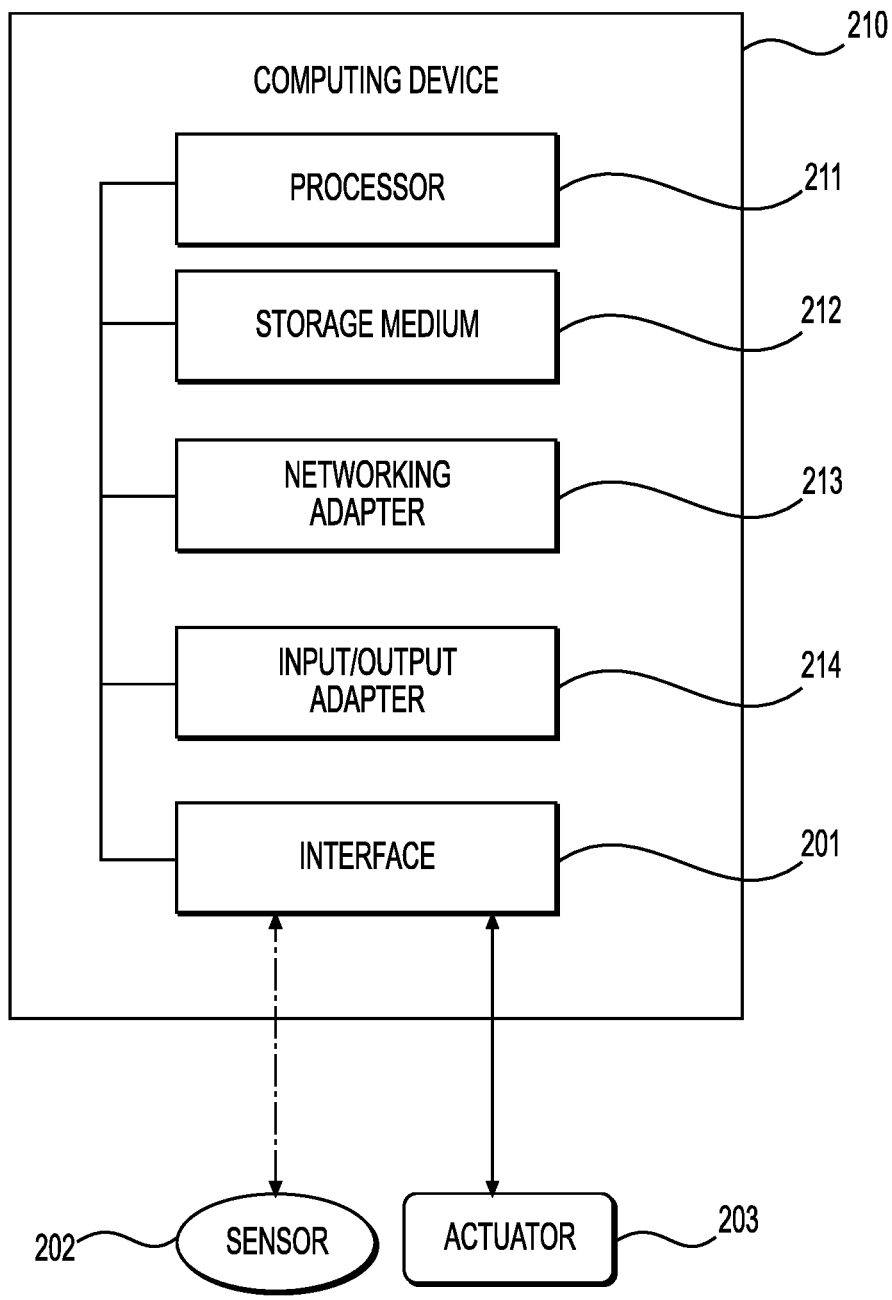
FIG. 10 shows a block diagram illustrating exemplary hardware computing device for implementing an embodiment of a system and method of the autonomy engine of the disclosed invention.

With reference to FIG. 10, shown is a block diagram illustrating exemplary hardware computing device for implementing an embodiment of a system and method for providing autonomous actions that are consistently applied to evolving missions in physical and virtual domains. The cognitive autonomous agent system 200 of the disclosed invention includes one or more computing devices 210 including one or more processors 211 and one or more non-transitory computer readable media 212 that includes instructions for an autonomy engine that performs the operations, for example, as shown in FIGS. 8A-8C. The computing device 210 further includes one or more networking adapters 213 for communications with operators, other cognitive autonomous systems, databases, or other external devices such as cloud hosts and servers. The networking adapters 213 may utilize any network facilities, such as wireless and satellite networks, for the communications. The computing device 210 may further include input/output adapter 214 for communications with user interfaces, displace devices or other external devices. The computing device 210 further includes interface 201 that includes sensor drivers 121 and actuator drivers 122 as shown in FIG. 9. The interface 201 communicates with the one or more sensors 202 and the one or more actuators 203. The interface 201 may directly communicate with the sensors 202 and actuators 203 with its own communication adapters, or communicate with the sensors 202 and actuators 203 through the networking adapter 213.

As described above, ENIAK has been demonstrated with various use cases and associated systems including, for example, providing the autonomy for a simulated unmanned underwater vehicle (UUV) to perform a mine hinting mission within the InnoVis simulator, and perform automation of human tasking to monitor, detect, and then produce work order generation for overvoltage conditions on rack mounted power supplies. Speed of development was demonstrated by integrating with the system without any prior knowledge of the system.

Some benefits of advanced automation include keeping our troops out of harm's way, reducing operator workload and fatigue, reducing human-induced error, enabling collaboration in dynamic and distributed environments, enabling our customers to keep pace with the increasing speed of battle, reducing the workforce demand, reducing program costs by reducing the human workforce, achieving faster mission response and execution time, dynamically configuring and updating mission plans, building transition path to cognitive autonomy without hardware changes. Benefits of cognitive autonomy include reducing communications through local processing and decision making, offloading human decision making, enhancing operations in anti-access/area denial (A2AD) environments, and dynamically discovering and integrating new assets.

The terms and descriptions used herein are set forth by way of illustration only and are not meant as limitations. Those skilled in the art will recognize that many variations are possible within the spirit and scope of the invention and the embodiments described herein.

What is claimed is:

1. A cognitive autonomous agent system for providing autonomous actions that are consistently applied to evolving missions in physical and virtual domains, comprising:
   one or more sensors deployed in physical and virtual domains to monitor and acquire data from the physical and virtual domains; and
   one or more computing devices including one or more processors and one or more non-transitory computer readable media including instructions for an autonomy engine, the instructions causing the one or more processors to execute the autonomy engine comprising:
      a sense component including one or more sensor drivers that are coupled to the one or more sensors, wherein the sense component acquires data from the sensors and extracts knowledge from the acquired data via artificial intelligence (AI) knowledge extraction and machine learning (ML);

a model component including a world model, wherein the model component receives the knowledge from the sense component, and creates or updates the world model based on the knowledge received from the sense component;

a decide component reacting to changes in the world model and generating a task based on the changes in the world model;

an act component receiving the task from the decide component and invoking actions to the physical and/or virtual domains based on the task, wherein the act component includes one or more actuator drivers to apply the invoked actions to the physical and virtual domains, wherein the act component updates the world model with expected effects of the invoked actions prior to applying the invoked action; and an intelligent agent kernel configured to implement an observe-orient-decide-act (OODA) loop through the sense component, the model component, the decide component and the act component.

2. The system of claim 1 further comprising one or more actuators coupled to the actuator drivers to apply the invoked actions to the physical and virtual domains.

3. The system of claim 1 wherein the instructions further comprising a collaboration component that provides collaborations with operators and another autonomy engines.

4. The system of claim 1 wherein the autonomy engine further comprises one or more hybrid drivers that are combinations of actuator drivers and sensor drivers, wherein the hybrid drivers are used when the sensed data is acquired by querying data to the sensors.

5. The system of claim 1 wherein the world model uses web ontology language (OWL) semantic web standard to represent the physical and virtual domains, and sensing and actuating capabilities.

6. The system of claim 1 wherein the world model includes knowledge of past, current, and future predicted states of the physical and virtual domains.

7. The system of claim 1 wherein the decide component is configured to provide reactions and plans, wherein the reactions are made based on manually generated rules and/or machine learning generated rules, and the plans are predefined plans and/or automatically generated plans.

8. The system of claim 1 wherein the act component monitors successes and failures of the invoked actions in order to evaluate preconditions of subsequent tasks.

9. The system of claim 1 wherein the intelligent agent kernel comprises Embedded Networked Intelligent Agent Kernel (ENIAK) as an underlying kernel.

10. The system of claim 1 wherein the sensors includes one or more selected from a group consisting of imaging sensors, acoustic sensors, motion sensors, temperature sensors, chemical sensors, and network sensors.

11. The system of claim 1 wherein said reacting to changes in the world model comprises:
passing triples that represent the knowledge to a decide component of the autonomy engine;
running a rule engine on each of the triples and determines whether the triple is a communications message or goal;
searching for a process that satisfies the goal if the triple is the goal;
generating a plan including tasks that implement capabilities if the process is found;
extracting tasks from the plan; and
passing the tasks to the actuator drivers.

12. A method for providing autonomous actions that are consistently applied to evolving missions in physical and virtual domains, comprising:
acquiring data from one or more sensors deployed in the physical and virtual domains;
converting the data into knowledge via a sense component of an autonomy engine, wherein the sense component includes one or more sensor drivers that are coupled to the one or more sensors and extract the knowledge from the acquired data via artificial intelligence (AI) knowledge extraction and machine learning (ML);
creating or updating a world model, via a model component of the autonomy engine, based on the knowledge received from the sensor component;
reacting to changes in the world model and generating one or more tasks, via a decide component of the autonomy engine, based on the changes in the world model;
invoking actions to the physical and/or virtual domains, via an act component of the autonomy engine, based on the tasks, wherein the act component includes one or more actuator drivers to apply the invoked actions to the physical and virtual domains, wherein an intelligent agent kernel implements an observe-orient-decide-act (OODA) loop through the sense component, the model component, the decide component and the act component; and
updating the world model with expected effects of the invoked actions prior to applying the invoked action.

13. The method of claim 12 wherein the actuator drivers are coupled to one or more actuators and the invoked actions are applied to the physical and virtual domains through the actuators.

14. The method of claim 12 wherein the creating or updating a world model comprises mapping the acquired data to the world model.

15. The method of claim 12 wherein the knowledge is represented by triples that define parameters including nominal status, goals, and business processes, unit tasks, and preconditions.

16. The method of claim 12 wherein said reacting to changes further comprises:
passing triples that represent the knowledge to a decide component of the autonomy engine;
running a rule engine on each of the triples and determines whether the triple is a communications message or goal;
searching for a process that satisfies the goal if the triple is the goal;
generating a plan including tasks that implement capabilities if the process is found;
extracting tasks from the plan; and
passing the tasks to the actuator drivers.

17. The method of claim 16 wherein said extracting tasks further comprises:
determining whether the plan is a unit task; and
passing the plan to a business process manager that steps through sub-tasks of the plan and choice points, if the plan is not the unit task.

18. The method of claim 12 wherein the autonomy engine further comprises one or more hybrid drivers that are combinations of actuator drivers and sensor drivers, wherein the hybrid drivers are used when the sensed data is acquired by querying data to the sensors.

19. The method of claim 12 wherein the intelligent agent kernel comprises Embedded Networked Intelligent Agent Kernel (ENIAK) as an underlying kernel.

20. The method of claim 12 wherein the sensors includes one or more selected from a group consisting of imaging sensors, acoustic sensors, motion sensors, temperature sensors, chemical sensors, and network sensors.

\* \* \* \* \*